Patented Oct. 22, 1946

2,409,740

UNITED STATES PATENT OFFICE 2,409,740

LOCOMOTIVE CONTROL SYSTEM

Richard M. Dilworth, Hinsdale, Torsten O. Lillquist, Clarendon Hills, and Donald H. Queeney, Naperville, Ill., assignors to General Motors Corporation, Detroit, Mich., a corporation of Delaware Application September 6, 1943, Serial No. 501,404

6 Claims. (Cl. 105—35)

The present invention generally relates to control systems for generating electric locomotives and more particularly relates to control means for stopping locomotives of this type in case of an emergency.

The principal object of the invention is to provide automatic control means in a generating electric drive and braking control system whereby the automatic means is caused to act in response to an emergency application of the automatic air brakes on the locomotive to reduce the power output of the locomotive power plant and to also shut off the fuel supplied to the power plant prime mover and auxiliaries thereby preventing drive of the locomotive and rendering it safe against damage by fire without rendering the electrical braking control means inoperative.

The control means for accomplishing this object together with other features of the invention will become apparent by reference to the following detailed description and accompanying drawings illustrating one form of the invention as applied to a generating electric locomotive provided with conventional automatic air brake apparatus.

Figure 1:
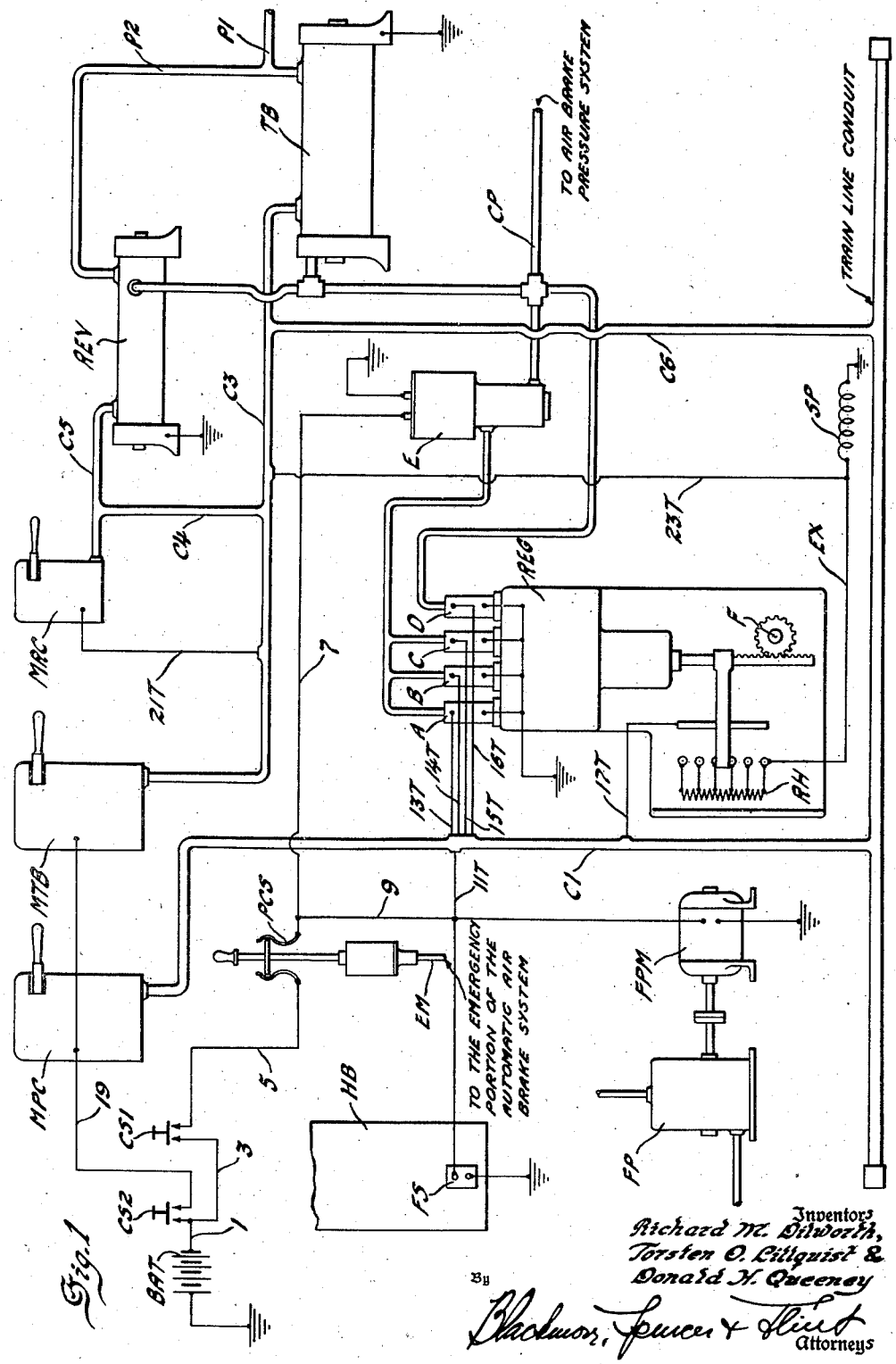
Figure 2:
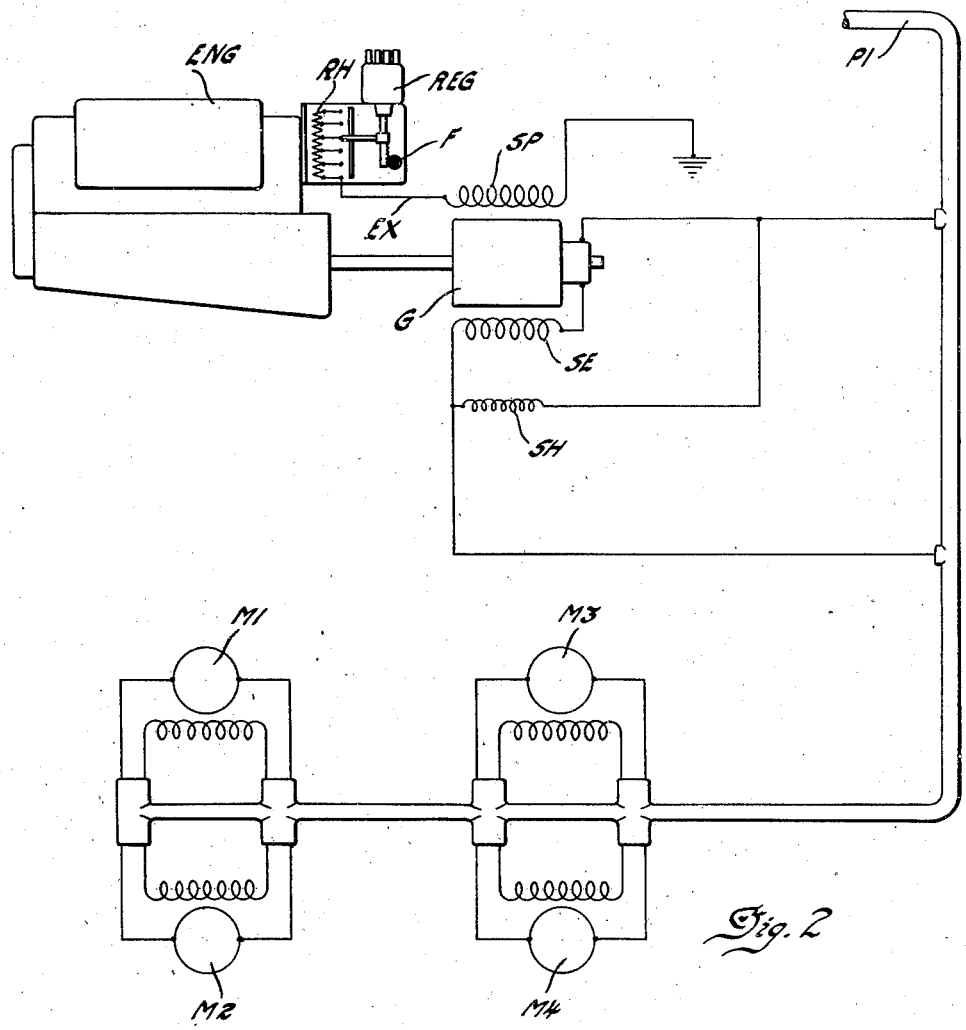

Figure 1 of the drawings diagrammatically illustrates the combined locomotive control means and control connections and;

Figure 2 is a diagrammatic view showing the locomotive generating electric traction system and certain of the control means and connections shown in Figure 1.

As best shown in Figure 2 the locomotive generating electric traction system includes a power plant and a plurality of traction motors adapted to be connected in forward or reverse driving circuit relation to the power plant and in dynamic braking circuit relation, in which the traction motor fields are connected to the power plant for excitation thereby.

The power plant comprises a Diesel engine prime mover ENG and an electric generator G driven thereby. The engine ENG and the locomotive train heating boiler HB are supplied with fuel oil by a fuel pump FP which is driven by a fuel pump motor FPM, as best shown in Figure 1. The heating boiler HB is provided with an electromagnetic fuel cutoff valve FS and this valve and the fuel pump motor FPM have one terminal grounded and the other terminals thereof are connected to a battery BAT having one terminal grounded, through a pneumatic control switch PCS and a manually operable control switch CS1 by means of control conductors 1, 3, 5, 7 and 9 and a train line conductor 11T. The pneumatic control switch PCS is shown provided with a pneumatic cylinder, a plunger movable therein which is provided with an electrical contact and an operating handle, and a pair of stationary flexible contacts to which the control conductors 5 and 7 are connected. The plunger contact is manually movable into contact with the fixed contacts by the handle shown attached thereto and the cylinder is connected by means of a pipe EM to the emergency portion of the conventional locomotive automatic air brake system, not shown, so that the plunger will move the plunger contact out of contact with the stationary contacts upon an emergency application of the air brakes to cause deenergization of the fuel pump motor FPM and boiler fuel shutoff switch in order to immediately cut off the fuel to the boiler HB and to cause the engine to stop after the fuel in the line between the fuel pump FP and engine is used up. It will be evident that an emergency application of the air brakes may be caused by manual movement of the engineer's brake valve to the emergency position or by automatic operation of the dead man or train control aparatus, not shown, included in the automatic air brake system in a well known manner.

The generator G is provided with series, shunt and separately excited field windings, indicated respectively at SE, SH and SP in Figure 2. Excitation controlling means comprising a field rheostat RH is shown connected by a conductor EX in series with the separately excited field winding SP, having one terminal grounded, for varying the excitation current therein and power output of the generator to cause a variation in the load on the engine ENG.

Speed responsive power output regulating means shown generally at REG is provided on the power plant for causing operation of the power plant at substantially constant values of speed, load and output. The output regulating means REG includes a speed responsive governor of any well known type which is driven by the engine ENG and acts in response to variations in the speed thereof to adjust the conventional engine fuel regulating means F and the rheostat RH in order to cause operation of the power plant at substantially constant speed, load and output in a well known manner. The output regulating means REG, as best shown in Figure 1, is provided with a plurality of electropneumatic means A, B, C and D which are mechanically connected, in a well known manner, to the speed responsive means of the governor to vary the speed response thereof in order to cause operation of the power plant at any one of a plurality of preselected constant values of speed, load and output between the maximum value and idling speed and minimum output and load, and to shut down the power plant. The electropneumatic means D is shown directly connected by pipe connections to a control pipe CP which is connected to the conventional locomotive air brake pressure source, not shown, and a combined electropneumatic shutoff and bleed valve E is shown connected by pipe connections between the control pipe CP and the electropneumatic means A, B and C. The valve E is of a well known type which, when electrically energized, causes air pressure to be applied to the electropneumatic means A, B and C, and when deenergized cuts off pressure thereto and bleeds these means to atmosphere to render them inoperative. One terminal of the valve E is grounded and the other terminal is connected to the control conductor 7 of the pressure control switch PCS to cause deenergization of the valve E upon an emergency application of the air brakes, thereby rendering the electropneumatic means A, B and C inoperative. One terminal of each of the electromagnetic means A, B, C and D is grounded and the other terminals and also one terminal of the field rheostat RH are separately connected by individual train line control conductors 13T, 14T, 15T, 16T and 17T which are included in a control conduit C1 shown extending between a locomotive train line conduit and a manually operable master power controller MPC provided with controller drum contacts and stationary contacts, not shown, to which these train line conductors are electrically connected. The previously mentioned train line conductor 11T connected to the pneumatic control switch PCS is also shown extending into the control conduit C1. The power terminal of the master controller MPC is connected to the battery BAT through a manually operable control switch CS2 by means of conductors 1 and 19. The contact arrangement of the controller MPC and the mechanical connections between the electropneumatic means A, B, C and D are arranged so that when the controller handle is moved to a stop controlling position, only the electropneumatic means D is energized to cause the power plant to be stopped, and when the controller handle is moved in steps between an idle speed and minimum output and load controlling position to a maximum speed, load and output controlling position, the electropneumatic means A, B and C are energized in different combinations and also in combination with the electropneumatic means D to cause operation of the power plant at constant values of speed, load and output corresponding to these controller positions. With the above pneumatic and electrical connection arrangement when the contacts of the pneumatic control switch PCS are opened upon an emergency application of the locomotive air brakes, the means A, B and C are rendered inoperative and if the electropneumatic means D is energized at this time, the power plant will be shut down, but if the means D is deenergized the power plant will be caused to operate at idling speed and minimum load and output.

The traction motors M1, M2, M3 and M4 are operably connected to individual locomotive axles, not shown, in conventional manner for driving or retarding the locomotive when the motors are electrically connected in forward or reverse driving or braking circuit relations with the power plant generator G by means of an electropneumatic transition and braking controller TB and an electropneumatic reverser REV, and suitable power connections included in the power conduits P1 and P2, shown extending between these controllers and the power plant generator and motors. The electropneumatic controller TB and the reverser REV are shown directly connected by pipe connections to the control air pipe CP. Train line control conductors are included in control conduits C3, C4, C5 and C6 for interconnecting the controller TB and reverser REV with a manually operable master transition and braking controller MTB and a manually operable reversing controller MRC and the train line conduit. One terminal of the controller TB and the reverser REV is grounded. The power terminal of the master reversing controller MRC is connected by means of a train line control conductor 21T, shown extending into the control conduit C3, to the master transition and braking controller MTB, the power terminal of which is shown connected to the conductor 19.

The master transition and braking controller MTB is provided with suitable driving and braking control contacts, not shown, which are manually operable for causing energization of the master reverser controller MRC and electropneumatic transition and braking controller TB when the controller handle provided on the controller MTB is moved to various driving and braking controlling positions. The master reverser controller MRC is provided with control contacts, not shown, and a handle which is movable between neutral and forward and reverse control positions to control energization and operation of the electropneumatic reverser REV in a well known manner whereby the traction motors M1, M2, M3 and M4 are connected in forward or reverse driving circuit relations with the generator G of the power plant. The master transition and braking controller MTB is also provided with a braking rheostat, not shown, in addition to the braking contacts for controlling the excitation of the generator and for controlling energization and operation of the controller TB in order to cause the field windings of the motors to be connected to the generator G and the motor armatures to be connected to braking resistors, not shown, to establish a dynamic braking circuit for the traction motors. Excitation of the generator separately excited field winding SP is controlled by movement of the braking rheostat to vary the generator output to the motor fields and thereby varying dynamic braking force generated by the motors in a well known manner. The braking rheostat included in the master controller MTB is connected between the battery BAT and the conductor EX by a train line conductor, shown extending from the control conduit C3 and connected directly to the conductor EX which, as previously mentioned, is connected to the ungrounded terminal of the separately excited generator field winding SP.

With the above described control arrangement when the manual control switches CS1 and CS2 are closed and the contacts of the pneumatic control switch PCS are closed by manual operation of the handle provided thereon, the traction motors may be connected in different driving circuit relations with the generator power plant and the output thereof may be increased to cause operation of the locomotive at any desired speed and load by manual operation of the master controllers MPC, MTB and MRC. Upon an emergency application of the locomotive air brakes, however, the contacts of the pneumatic switch PCS are automatically opened by the pneumatically actuated switch plunger which causes deenergization of the boiler fuel shutoff switch FS, the fuel pump motor FPM, and the electropneumatic pressure shutoff and bleed valve E. When the switch FS is deenergized the fuel to the heating boiler is immediately cut off to extinguish the fire therein, and, as previously described, when the fuel pump motor FPM is deenergized the fuel pump motor FPM is stopped which causes a shut down of the engine after all the fuel in the line between the pump and the engine is used up. The time the engine operates after the fuel pump is stopped may be regulated by varying the amount of fuel in the line. When the combined electropneumatic pressure cutoff and bleed valve is deenergized, air presssure is cut off to the electropneumatic means A, B and C of the output regulating means REG and the means A, B and C are vented to atmosphere to render them inoperative in order to prevent drive of the locomotive by the traction motors. As previously explained when the means A, B and C are rendered inoperative with the electropneumatic means D energized and operative for certain positions of the master output controller MPC, the power plant is shut down completely and when the means D is deenergized and inoperative for other controller positions the power plant is caused to operate at minimum speed, load and output which also prevents drive of the locomotive by the traction motors.

When the power plant is operating at minimum speed, load and output the traction motors may be connected in dynamic braking circuit relation and the braking force varied by movement of the master transmission and braking controller MTB between the braking positions to vary the excitation current supplied to the traction motors fields from the generator of the power plant, as sufficient current is then supplied by the generator for this purpose.

Upon shut down of the power plant by energization and operation of the electropnuematic means D, or upon the fuel in the supply line from the fuel pump FP being used up by the engine after the fuel pump motor FPM is deenergized, the traction motor fields cannot then be excited from the generator to obtain dynamic braking but the motors then may be electrically connected across the then inoperative generator in reversed driving circuit relation to cause a rapid build-up of the traction motors as generators to provide additional emergency braking means for the locomotive.

The above generating electric drive and braking system enables the locomotive to be driven in either direction or retarded by the generating electric traction means by manual operation of the master controllers, and the pneumatic control switch PCS acts automatically in response to an emergency application of the locomotive air brakes to cause an automatic reduction in the speed, load and output of the power plant to a minimum value or to shut it down completely thereby to prevent further drive of the locomotive, however, the manually operable dynamic braking controls are still operative when the power plant is operated at minimum speed, load and output, and the manually operable motor reversing control means is still operative to reverse the motors in order to provide additional emergency braking action when the power plant is shut down. It will be apparent that the train line control conductors included in the locomotive train line conduit may be connected in parallel with similar control means on other locomotive units whereby these units may be then controlled and operated in multiple by operation of the master controllers of any locomotive unit.

We claim:

1. A control system for a locomotive including an automatic air brake system, a generating electric traction system comprising a power plant and a plurality of traction motors, means for electrically connecting said motors in forward and reverse driving and braking circuit relations with said power plant, output regulating means for said power plant, and automatic control means for said output regulating means acting in response to an emergency application of said air brakes to automatically prevent operation of said power plant at other than a minimum value of output sufficient to cause said motors, when connected in braking circuit relation with the power plant, to serve only as brakes.

2. A control system for a locomotive including an automatic air brake system, a generating electric traction system comprising a power plant and a plurality of electric traction motors, said power plant comprising a Diesel engine and an electrical generator driven thereby, output varying means for said power plant, means for supplying fuel to said engine, power connections including connection changing means between said generator and said motors for connecting the motors in forward and reverse driving and in dynamic braking circuit relations with said generator, and control means acting in response to an emergency application of the locomotive air brakes for automatically rendering inoperative the engine fuel supplying means and for controlling said output regulating means to cause only sufficient power to be supplied by the power plant to serve as brakes until shut down of the engine by shut down of the fuel supplying means whereby the motors can act only as brakes when connected to the power plant in braking circuit relations.

3. A control system for a locomotive including an automatic air brake system, a generating electric traction system comprising a power plant and a plurality of electric traction motors, said power plant comprising an engine and an electric generator driven thereby, means for controlling the engine and generator output, means for supplying fuel to said engine, electrical power connections including connection changing means between said generator and motors for connecting said motors in driving and braking circuit relations, and emergency control means acting in response to an emergency application of the locomotive air brakes for automatically rendering the fuel supplying means inoperative and for controlling the engine and generator output controlling means whereby no additional fuel is supplied to the engine and the engine and generator output is reduced to a value sufficient to cause the motors to act only as brakes prior to and after shut down of the engine by lack of fuel supplied thereto when the motors are connected in different braking circuit relations with the power plant.

4. A control system for a locomotive including automatic air brakes, a generating electric traction system including a power plant and a plurality of electric traction motors, said power plant comprising an engine and an electric generator driven thereby, output regulating means for said power plant engine and generator, said regulating means being operable to control shut down or operation of said power plant at preselected values of output between minimum and maximum values, manual means for controlling operation of said regulating means, electrical power connections between said generator and motors including a second manual control means operable for connecting said motors in driving and braking circuit relations with the generator, and automatic control means acting only in response to an automatic application of the air brakes to render a portion of the output regulating means inoperative to cause a reduction in the output of the power plant or shut down thereof, depending upon the position of the manually operable means and to cause the motors to then serve only as additional emergency braking means by connection thereof in braking circuit relation with the power plant by said second manually operable means.

5. A control system for a locomotive including an automatic air brake system, a generating electric traction system comprising a Diesel engine, an electric generator driven thereby, generator excitation varying means, a plurality of electric traction motors and electrical power connections including manually controlled means for causing the motors to be connected in forward and reverse drive and in different braking circuit relations with the generator, and for operating the generator excitation varying means when the motors are connected in one braking circuit relation to vary the braking force exerted by the motors, manually controlled power plant output controlling devices operable separately and in combination to cause the power plant to be operated at preselected values of speed, load and output or to be shut down, and means acting automatically in response to an emergency application of the air brakes for rendering certain of said manually controlled output controlling devices inoperative to cause operation of said power only at low values of speed, load and output or to be shut down depending upon the number of devices operating at the time of the emergency thereby to cause emergency operation of the motors only as brakes when the motors are connected in the different braking circuit relations with the power plant generator.

6. A control system for a locomotive including an automatic air brake system, a generating electric power plant comprising a Diesel engine and an electric generator driven thereby, generator excitation varying means, means for supplying fuel to said engine, engine speed responsive output regulating means for regulating the fuel supplied to said engine and the generator excitation varying means to cause operation of said power plant at substantially constant speed, load and output, a plurality of speed response varying means for said regulator, said means being operable separately and in combinations to cause operation of said power plant at preselected constant values of speed, load and output and to cause shut down of said power plant, means for rendering certain of said speed response varying means inoperative to cause shut down of said engine or operation thereof at minimum speed, load and output, depending upon the combination of speed response varying means operating, a plurality of traction motors, power connections between said generator and said motors including connection changing means for connecting said motors in various forward and reverse driving and braking relations with said generator, a master power controller for controlling said speed response varying means, a master motor controller for controlling said motor connection changing means, said master motor controller also including a second generator excitation varying means to control braking action of said motors when connected to the generator in one braking circuit relation, a master reversing controller for controlling reverse driving and braking by said motors when the power plant is shut down, automatic means acting only in response to an emergency application of said air brakes to simultaneously render the fuel supplying means and certain of said speed response varying means inoperative and thereby immediately cause the speed, load and output of said power plant to be reduced to a low value and to subsequently cause shutdown thereof for certain positions of said master power controller when the engine fuel is used up in order to cause variable braking action by the motors, subsequent to shut down of the power plant, by operation of the generator excitation varying means in said master motor controller or to cause the power plant to be shut down immediately for certain other positions of said master power controller to cause braking action of said motors by operation of the master reversing controller and train line control connections between said master controllers and said automatic means adapted to be connected to similar connections on other similar locomotive units for multiple unit control of the connected units whereby one or more locomotives may be adequately protected against impact in an emergency.

RICHARD M. DILWORTH.
TORSTEN O. LILLQUIST.
DONALD H. QUEENEY.